United States Patent [19]
Kurz

[11] 3,874,861
[45] Apr. 1, 1975

[54] METHOD OF PRODUCING FOAMED GLASS
[76] Inventor: Fredrik Wilhelm Anton Kurz, Nysatravagen 12, Lidingo, Sweden
[22] Filed: Aug. 20, 1973
[21] Appl. No.: 389,440

Related U.S. Application Data
[63] Continuation of Ser. No. 117,717, Feb. 22, 1971, abandoned.

[30] Foreign Application Priority Data
Feb. 26, 1970 Sweden.............................. 2553/70

[52] U.S. Cl........................................ 65/20, 65/22
[51] Int. Cl........................................ C03b 19/08
[58] Field of Search.................................. 65/22, 20

[56] References Cited
UNITED STATES PATENTS
| | | | |
|---|---|---|---|
| 3,174,870 | 3/1965 | Connelly.............................. | 65/22 X |
| 3,441,396 | 4/1969 | D'Eustachio et al................... | 65/22 |
| 3,532,480 | 10/1970 | D'Eustachio............................ | 65/20 |
| 3,663,249 | 5/1972 | Rao..................................... | 65/20 X |
| 3,666,506 | 5/1972 | Cowan, Jr. et al..................... | 65/22 |

Primary Examiner—S. Leon Bashore
Assistant Examiner—Frank W. Miga
Attorney, Agent, or Firm—Stevens, Davis, Miller & Mosher

[57] ABSTRACT

A method is described for producing foamed glass characterized by (1) blending mineral powders, which are amorphous, or capable of being rendered amorphous by heating to a few hundred degrees centigrade, and which have a high $SiO_2$ content and large specific area, with gas forming agents and alkali silicate, and (2) heating this mixture in the range 750 to 950°C, whereby the mixture expands due to formation of gas therein and becomes set in the thus-expanded condition.

15 Claims, No Drawings

The powders should also possess reactivity which is either present a priori or which can be promoted by treatment processes, such as:

a. Expansion with simultaneous removal of chemically bound water or gases, e.g. perlite which has been heated to about 1000°C with simultaneous expansion. It has been found that crushed non-expanded perlite with otherwise the same chemical composition is not suitable as a raw material for foamed glass according to the present process. (Nor are expanded perlite pellets without crushing to a powder suitable, as they cannot react with the other elements to form a homogeneous glass, but only be bound together).

b. Boiling in digesting liquids, e.g. water glass.

c. Moistening or spraying with digesting substances.

d. Calcination.

Alkali silicate can in principle be added in different forms, e.g., sodium or potassium water glass or solid alkali silicate. The simplest and cheapest is commercial water glass (aqueous alkali metal silicate), although alkali hydroxide or alkali carbonate, and other ingredients conventionally used as raw material for the manufacture of alkali silicate (water glass) can be substituted if desired. These latter materials must then be digested together with the other materials required to form the foamed glass.

It is known that aqueous alkali metal silicates when heated above the boiling point form hard porous materials which are brittle, however, and have no chemical resistance so that they decompose in a moist atmosphere. Some additives improve the resistance somewhat but the pore-formation is so irregular that uniformly porous foamed glass blocks have only been made in two-stage processes as described in U.S. Pat. No. 3,150,988 and 3,184,371. In accordance with the present invention, it is possible to complete the process in one stage, although it can be carried out, when desired, as a two-stage process, as explained below.

The components are preferably used in weight proportions such that for 100 parts by weight of mineral powders (amorphous and/or crystalline) 50 to 150 parts by weight of alkali silicate solids are present. When both amorphous and/or latently amorphous mineral powders and crystalline powders are used, the amount of amorphous mineral powder will normally be 25 to 60% by weight of the total amount of mineral powders.

After mixing the ingredients, foaming can be effected in various ways. Thus, it is possible to carry out a continuous single stage process by heating the mixture of powders and water glass for from 1½ to 3½ hours at a temperature from 750° to 950°C, the exact temperature depending on the composition of the powders selected, and then subjecting the material to slow cooling. As the material is heated, the water in the water glass, together with any water chemically bound in the starting materials, will slowly evaporate, and gases are formed by reaction between the various ingredients.

The foaming and pore-forming process has been studied at temperatures between 100° and 900°C by means of an electron microscope. When the water of the aqueous alkali metal silicate starts to evaporate (100°C) the pore-forming process starts. Evaporation may be started even earlier and inntensified by adding silicon or silicides, whereby hydrogen in evolved. This reaction, however, is difficult to control where the silicon or silicides are present in an amount exceeding about 2% of the aqueous alkali metal silicate solution, by weight. The powders added to the alkali silicate regularize the pore-forming process to some extent, but up to about 350°C, at which temperature most of the water is evaporated, the bubbles are irregularly dispersed in the body. Large cavities are found particularly in the upper portion of the body. At about 500°C the bubbles become smaller and more rounded, but there are still cavities, in particular in the middle portion of the body, which are pregressively filled by evolution of gas in other portions.

On further temperature increase above about 750°C, the alkali silicate forms a resistant compound with the metal oxides of the added powders, the cell walls sinter and form closed pores and the gas-forming substances evolve gases and enlarge the pores again, but in a regular manner.

An expedient which may be used to make the pores more uniform is to maintain a reducing atmosphere up to a temperature of 800° to 900°C. Under these conditions, evolution of $CO_2$ and $SO_3$ is delayed somewhat and occurs only after the bubbles formed by the water vapor have become smaller and more rounded and the cell walls have started to sinter.

Where the foamed glass is made from glass powder this involves the use of a pre-formed glass so that the minute spaces between the individual glass particles exist during the primary stage of the pore-forming process, and these minute spaces are later expanded by the $CO_2$ gas. In the present water glass method, a glass is first formed by reaction between the alkali silicate and the glass-forming powders and the irregular bubbles which are formed by vaporizing moisture are thereafter divided to form a regular pore system. Only in this way it is possible to incorporate in the foamed product resistant metal oxides which are not present to a sufficient extent in conventional glass powders.

The maximum foaming temperature depending on the composition (which may be varied considerably) will be between 750° and 950°C, mostly between 850° and 950°C. It is advantageous to maintain the batch only for a short while at the peak temperature and then keep it for about 20 to 45 minutes at a temperature of about 20°C below peak temperature, so that the final foaming occurs under relatively quiet conditions.

After the final foaming, the product is given a slow cooling (annealing) for several hours in the manner customary to relieve stresses in the glass.

It is also possible to produce the foamed product in a two-stage process, wherein after the major portion of the water is evaporated by heating to 200°-350°C, the mass is cooled and pulverized. The major foaming reaction is then achieved by heating the intermediate product to 750°-950°C. The process of drying, pulverizing and granulating the mass in a two-stage operation can also be effected in a spray dryer.

Suitable amorphous mineral powders for this process include: expanded perlite dust which is concomitantly produced along with the expanded perlite from expansion processes and for which no use has hitherto been found, said dust having a particle size of about 1 micron and below; finely-ground expanded perlite powder of similar particle size, perlite containing approximately 75% $SiO_2$ and approximately 15% $Al_2O_3$; diatomaceous earth; infusorial earth; pumice; $SiO_2$ material, fly ash and silica dust condensed fume caught in filters or smoke stacks from industrial operations, such as the

METHOD OF PRODUCING FOAMED GLASS

This is a continuation of application Ser. No. 117,717, filed Feb. 22, 1971, now abandoned.

Inorganic lightweight cellular materials consist either of foamed glass or of foamed clays (ceramics), i.e., they are amorphous or crystalline or semicrystalline. As a rule, glass is foamed within a temperature range below 1000°C, mostly between 700 and 900°C, and may be produced with bulk densities below 0.2 kg per liter, sometimes even below 0.15 kg per liter, while clays, because of their higher sintering temperatures require temperatures above 1100°C and the bulk density is essentially higher and most often above 0.35.

The invention herein described and claimed relates to a novel and improved method of making foamed glass.

Foamed glass is generally made from glass powder, which is obtained by grinding ordinary glass such as window or bottle glass to achieve a surface area of about 8000 sq.cm. per gram. The glass powder is mixed with gas-forming agents, generally carbon or organic substances, such as sugars, glycerol, urea, etc. and/or $SO_3$ producing substances, which latter may partly or wholly be included in the glass. The mixture is heated to sintering temperatures, so that the individual glass particles fuse sufficiently to form a coherent porous body with a multiplicity of small cells between the sintered particles which define the cell walls. As heating continues, the carbon or the organic substances form $CO$ and $CO_2$ and the sulfur-bearing substances form $SO_3$ and these gases expand the cells present between the glass particles, whereby the volume of the body is increased.

However, such conventional methods of making foamed glass have serious disadvantages, more especially:

a. It is highly expensive and time-consuming to grind the glass base material to a surface area of about 8000 sq. cm. per gram.

b. The glass powder is made from glass melting at temperatures between 1400° and 1500°C, and highly resistant metal oxides are included only to a very limited extent, since such metal oxides require much higher temperatures to be incorporated in a glass melt. A normal glass making batch is composed of 72.5% $SiO_2$, 2.5% $Al_2O_3$, 6% CaO, 16.5% $Na_2O$ and 2.5% $K_2O$, thus containing a relatively great amount of alkali (19%), a minor amount of $Al_2O_3$ and no MgO. It is very difficult to include in a glass melt more than 2 or 3% of the highly resistant metal oxides $Al_2O_3$ and MgO, although it is well-known that they improve the chemical and mechanical resistance.

A number of advantageous properties of $Al_2O_3$ as a glass-forming oxide are described in Dralle-Keppeler, "Glasfabrikation," page 178, for example, and may be summarized as follows: The tendency to crystallization is reduced. Due to low solubility, the chemical resistance is improved, and the mechanical characteristics are also increased. Other advantages include a lower coefficient of expansion, greater resistance to temperature variations and higher refractoriness.

The inclusion of MgO in the glass has the advantages of lowering the weight, the coefficient of expansion and the brittleness. It improves the chemical resistance and the refractoriness. The magnesium silicate differs in its molecular structure from other silicates, whereby the molecules are more strongly enmeshed with each other resulting in a stronger structure.

The low resistance of conventional glass may be improved somewhat by replacing the alkali by boric acid. This, however, makes the glass more expensive, and highly resistant metal oxides cannot be included in such glass to any considerable extent.

There exist a few methods, which are principally of a theoretical interest with little practical application, which include the use of aqueous alkali metal silicates (so-called water glass) in the production of foamed glass, together with glass powder or other fillers which are bound together to form a porous lightweight material without converting such fillers to a glass. The aqueous alkali metal silicate is added to bind together the individual particles or to disperse the various additives in a better way. In these cases, however, the alkali metal silicate does not serve as a glass-forming substance, and the resulting lowered sintering temperature has the disadvantage that the alkali does not form a chemical compound with the powder, whereby it is easily leached out by moisture.

The present invention is based on the combination of glass-forming and gas-forming substances which sinter to form a foam structure at a temperature of between 750°–950°C (according to composition) and provide a fine-pore, purely inorganic product of very low bulk density, below 0.2, and of relatively high mechanical strength, with exceptionally high insulating properties.

The glass-forming elements comprise principally amorphous mineral powders having a high $SiO_2$ content together with one or more multivalent metal oxides, and 2) alkali-containing substances, primarily alkali silicates, such as water glass, and may also include minor amounts of crystalline materials.

To obtain a resistant foamed glass by the use of alkali metal silicate and without glass powder, the following requirements should be satisfied:

a. Resistant metal oxides, such as alumina, magnesia, iron oxides, etc., must be supplied in such a condition that they can react with the alkali metal silicate to form a glass. The metal oxides per se would require much higher temperatures, but if they are present in previously molten material, in amorphous or latently amorphous form and also in a state of fine division (with a specific surface area of at least 3000 sq. cm. per gram) this is satisfactory.

b. The alkali silicate ("water glass") should react so with the other additives that the alkali will not be leached out by boiling the final product. Thus, there must be formed an insoluble metal alkali silicate glass, in which the alkali content is less than 15% or not more than 15% by weight.

By a suitable selection of the starting materials it is possible to secure a more favorable but resistant composition of the glass, preferably about 70–72% $SiO_2$, about 15% alkali oxide, about 5% $Al_2O_3$, about 5% MgO and the remainder other oxides, but not more than 2–3% CaO.

By reaction of the alkali metal silicate with the resistant metal oxides of the powders, a eutectic results whereby glass is formed at much lower temperatures than otherwise required for melting glass. Thus, in spite of the lower temperature it will be possible to include higher percentages of resistant metal oxides than in conventional melting of glass.

manufacture of ferrosilicon, having a high content of $SiO_2$ and one or more metal oxides; slags of various compositions from different manufacturing processes, naturally occurring minerals such as basalt tuff, apatite, obsidian, linnaeite, etc. Also, glass powder or fibrous silicate materials can be added, in which case a powder richer in the desired metal oxides should also be added. Several of these amorphous minerals have obtained their glassy structure during processes in which difficultly melted metal oxides have been incorporated in the glass phase. From this very wide range of suitable materials the actual choice is largely based upon economic rather than technological considerations.

The charge may also contain in combination crystalline powders (including crystalline slag substances) provided that such powders react with the amorphous powders and the water glass, to pass into the glass phase, at a temperature between 750° and 950°C. Minerals containing MgO, such as magnesite or dolomite, are of primary interest in this respect, as these minerals also contribute $CO_2$ to the charge which adds to the formation of gas. Combinations of magnesite or dolomite with talc, preferably in the form of microtalc, are particularly advantageous. Microtalc contains approximately 39% $SiO_2$, 33% MgO, 6% FeO, 17% $CO_2$ with small amounts of minor constituents.

It is impossible to introduce more than 5% MgO into a glass melt. The usual glass powders, however, do not contain MgO. The presence of magnesium oxide in the glass presents the advantage of a lower weight and lower coefficient of expansion, less liability to fracture, lower cooling temperature, less tendency to devitrify, lower softening temperatures, higher chemical resistance and greater resistance to changes in temperature.

Alumina ($Al_2O_3$) in addition to being added through the medium of perlite can also be added through certain clays, kaolin, mephelin syenite, felspar, bentonite, red or white burning clay, etc. In general such clays contain 40–65% $SiO_2$ and 18–47% $Al_2O_3$. $SiO_2$ may also be added to the mix as quartsite powder if desired. Calcium can be added in the form of $Ca(OH)_2$, $CaCO_3$ or gypsum, in small quantities (less than 2%).

The gas-forming agents necessary for foaming may be provided in whole or in part by the glass-forming powders, for example, the C in grey perlite powder, $CO_2$ in magnesite and limestone, $SO_3$ in gypsum, etc. Alternatively, these agents may be charged separately to the sytem. It is important, however, that the gas forming substances are in intimate contact with the powder. Soluble gas-forming agents can also be incorporated in the water glass, possibly at elevated temperatures, to accelerate solubilization.

The action of different gas-forming agents is known in the art. Carbon can be added in the form of activated carbon, in quantities corresponding to about 0.3–1% of the total mass, or in the form of molasses, sugar, glycerine, urea, non-expanded polystyrene, etc. in corresponding amounts.

Hydrogen gas can be formed by adding aluminum powder or silicides (less than 1% based on the alkali silicate), as previously indicated.

The expansion and pore formation apparently is caused in the lower temperature ranges by the evaporating water and in the higher temperature ranges, mostly between 750°–950°C, by water vapor along with gases from the reacting components such as $CO_2$ (from carbonates), CO (formed by reaction of carbon), $H_2S$, $SO_2$ or $SO_3$ (from sulfates, sulfites or sulfides).

To facilitate dispersion, different alkali-resistant wetting agents can be added to the system. Sodium hexametaphosphate, in quantities of 1–3 of the total mass, can be used for this purpose.

Other additives which may be used to advantage, according to the raw materials used, include phosphoric acid, cryolite, dicyandiamide, triethanolamine, siliconfluorides and some oils, e.g., tall oil, which when added in very small quantities may also favorably affect surface tension.

Reinforcing material in the form of iron wire, metal shavings, expanded clay etc., can also be incorporated in the foamed product if desired.

If the process is carried out in two stages, the granules obtained as an intermediate product can be used in conventional fields. The final product before being cooled may also be treated in an autoclave, thereby strengthening the product in a manner similar to that used with lightweight cellular or gas concrete.

Normally, sintered foam glass has closed cells, but it is also possible to obtain open, communicating pores which vary according to a temperature curve or according to the treatment to which the glass was subjected prior or subsequent to cooling the same.

This invention will now be illustrated by means of the following examples, but the conditions therein described are not limiting as the foregoing disclosure makes clear.

EXAMPLE 1

160 parts by weight of aqueous sodium silicate 48/50°Be and 40 parts by weight of water were added with 40 parts by weight of expanded grey perlite containing 0.5% carbon, 40 parts by weight of microtalc and 5 parts by weight of gypsum. The mixture was then kneaded into a dough, which became slightly moist on the surface. The dough was placed in a metallic mould and the mould and contents were transferred to an oven and heated for 1½–2½ hours to about 840°C. The product was held for some minutes at the highest temperature, and then it was cooled for several hours. A foamed glass having excellent chemical and mechanical properties was obtained.

Instead of stationary moulds, the starting mixture may be placed upon a travelling belt provided with suitable side portions, and the heating and cooling carried out continuously as the belt traverses heating and cooling zones.

The time required for cooling the foamed product prepared in accordance with the invention will vary from 5 to 12 hours, depending upon the type of furnace and the composition of the starting mixture.

EXAMPLE 2

A composition containing the same constituents as those used in Example 1 and blended in the same quantities was heated only to about 250°C and maintained at this temperature for from 2 to 3 hours, until most of the water had evaporated. The resulting product was then cooled and pulverized, this latter being relatively easy to accomplish because of the brittle nature of the product. The granulate obtained was heated to a temperature slightly above 800°C, whereupon the product began to expand under the influence of the carbon and sulphur gas promotors present in the product. The product was then slowly cooled to room temperture. A foamed glass having excellent chemical and mechanical properties was obtained.

In this operation in two stages with intermediate cooling and pulverizing, it is essential that sufficient water be present in the intermediate product to provide water vapor for cooperation with the gases from carbon and sulfur components in the second stage pore formation and to prevent surface cracking in the final product.

EXAMPLE 3

A starting mixture of 160 parts by weight aqueous sodium silicate 48/50°Be, 100 parts by weight water, 40 parts by weight grey expanded perlite dust containing 0.5% carbon, 40 parts by weight microtalc and 5 parts by weight of gypsum was placed in a closed container and heated to about 200°C. The fused mass was then passed through a spray dryer, in which the major portion of the water, 80–90%, was evaporated. The product was in the form of a small granulate when sprayed, and the granulate was subsequently heated in moulds on continuous belt conveyors to a temperature of about 800°C, at which foaming and sintering took place to produce a foamed glass having good chemical and mechanical resistance.

EXAMPLE 4

40 parts by weight of expanded grey perlite powder containing 0.5%C, 40 parts by weight of microtalc and 5 parts by weight of gypsum were mixed with 80 parts by weight of crushed raw glass (raw material for water glass) and digested with 120 parts by weight of water in an autoclave at 5 to 6 atmospheres. Then, the reaction mass was passed through a spray dryer and treated as in Example 3. A similar product was obtained.

EXAMPLE 5

A composition containing 200 parts by weight of aqueous sodium silicate, 48/50°Be, 20 parts by weight of water, 40 parts by weight of white expanded perlite powder (without carbon), 20 parts by weight of condensed silica fume, 30 parts by weight of microtalc, 10 parts by weight of kaolin, 5 parts by weight of sodium thiosulphate, 0.6 part by weight of activated carbon, was treated in the manner described in Example 1, except that the temperature in the final heating stage was about 880°C. A foamed product of similar properties was obtained.

EXAMPLE 6

A mixture of 200 parts by weight of aqueous sodium silicate, 48/50°Be, 20 parts by weight of water, 40 parts of weight of kieselguhr, 40 parts by weight of pulverized slag, 25 parts by weight of pulverized magnesite, 10 parts by weight of expandable clay, 2 parts by weight of molasses, was treated in the manner described in Example 1 to produce a foamed glass having properties similar to that of Example 1.

EXAMPLE 7

The composition comprised 40 parts by weight of NaOH, 60 parts by weight of water, 64 parts by weight of grey perlite powder (0,5%C), 10 parts by weight of kaolin. The composition was then treated as described in Examples 1 – 3.

EXAMPLE 8

The composition comprised 200 parts by weight of aqueous silicate 48/50°Be, 20 parts by weight of water, 40 parts by weight of white perlite powder, 15 parts by weight of dolomite, 3 parts by weight of metal sulphate (e.g. $NiSO_4$ or $ZnSO_4$), 1,5 parts by weight of $Ca(OH)_2$, 2 parts by weight of sugar (dissolved in water). Thereafter treating as described in Examples 1 – 3.

EXAMPLE 9

The composition comprised 300 parts by weight of aqueous sodium silicate 48/50°Be, 16 parts by weight of KOH, 57 parts by weight of white perlite powder, 42 parts by weight of redburning clay, 57 parts by weight of water, 75 parts by weight of condensed silica fume, 95 parts by weight of microtalc, 4 parts by weight of glycerine. The composition was then treated as described in Examples 1 – 3, but heating for 3 – 3.5 hours to about 920°C.

EXAMPLE 10

The composition comprised 320 parts by weight of aqueous sodium silicate 38/40°Be, 14 parts by weight of NaOH, 70 parts by weight of redburning clay, 10 parts by weight of cryolite, 46 parts by weight of water, 97 parts by weight of condensed silica fume, 55 parts by weight of microtalc, 4 parts by weight of glycerine. Treating as described in Example 1 – 3, but heating to about 950°C.

EXAMPLE 11

The composition comprised 200 parts by weight of aqueous sodium silicate 48/50°Be, 75 parts by weight of white burning clay, 7 parts by weight of cryolite, 40 parts by weight of water, 50 parts by weight of condensed silica Mg-fume, 5 parts by weight of not expanded polystyrene and 2 parts by weight of glycerine. Treating as in Example 10.

EXAMPLE 12

One of the aforementioned compositions was used, but the powders were first sprayed either with a water glass solution or with an alkali silicate powder /trisilicate/.

EXAMPLE 13

One of the aforementioned compositions was used, added with 2 parts by weight of sodium hexametaphosphate and 1 part by weight of dicyandiamide.

EXAMPLE 14

One of the aforementioned compositions was used added with further 3 parts by weight of 70% phosphoric acid.

In all of Examples 7 to 14 foamed glass products were obtained which exhibited excellent chemical and mechanical resistance.

EXAMPLE 15

One of the aforementioned compositions was added with small quantities of reinforcing material in form of thin heat resistant steel wire cut into short lengths and then treated in a similar manner to produce a reinforced foamed glass. Alternatively, the reinforcement may comprise small metal spheres, bloated clay pellets or the like.

It should be understood, of course, that the foregoing description relates to only preferred embodiments of the invention and that numerous modifications or alterations may be made therein without departing from the spirit and scope of the invention as set forth in the appended claims.

I claim:

1. A method of producing inorganic foamed glass of a density below 0.2 which comprises mixing in glass forming proportions mineral powders which are amorphous and which contain metal oxides comprising not more than 3% CaO and capable of making glass chemically and mechanically resistant and have a specific surface area of at least 3000 cm²/g with gas forming agents and alkali metal silicate and heating the mixture at 750°– 950°C. to form a glass by reaction of said mineral powders with the alkali metal silicate and to expand and foam the resulting glass, the proportion of mineral powder to alkali silicate in said mixture being from 2/1 to 1/3, wherein the alkali metal silicate in the foamed glass is insoluble and the alkali content of the foamed glass being not more than 15% by weight.

2. The method of claim 1 including mixing crystalline powders which contain resistant metal oxides with said amorphous mineral powder.

3. The method of claim 1 in which the alkali silicate is selected from the group consisting of sodium water glass, potassium water glass and solid alkali silicate.

4. The method of claim 1 wherein the metal oxides are selected from the group consisting of Al, Mg, Ca and Fe.

5. The method of claim 2 wherein the amorphous mineral powder constitutes 25 to 60% by weight of the total mineral powder component of the mixture.

6. The method of claim 1 wherein the mixture is heated for 1½ to 3½ hours.

7. The method of claim 1 in which the mixture includes an alkali hydroxide.

8. The method of claim 1 in which the mixture includes an alkali carbonate.

9. The method of claim 1 in which the mixture includes a hydrogen-evolving substance.

10. The method of claim 1 in which the mixture includes a reinforcing material.

11. The method of claim 1 in which the mixture includes phosphoric acid.

12. The method of claim 1 in which the mixture includes hexametaphosphate.

13. The method of claim 1 in which the mixture includes dicyandiamide.

14. The method of claim 1 in which the mixture includes triethanolamine.

15. The method of claim 1 wherein the gas forming agents are selected from the group consisting of carbon, sulfur, carbon containing compounds and sulfur containing compounds.

* * * * *

UNITED STATES PATENT OFFICE
CERTIFICATE OF CORRECTION

PATENT NO. : 3,874,861
DATED : April 1, 1975
INVENTOR(S) : Fredrik Wilhelm Anton KURZ It is certified that error appears in the above-identified patent and that said Letters Patent are hereby corrected as shown below:

Insert the following under [30]:

-- September 5, 1968 Sweden 11990/68 --.

Signed and Sealed this second Day of September 1975

[SEAL]

Attest:

RUTH C. MASON
Attesting Officer

C. MARSHALL DANN
Commissioner of Patents and Trademarks